July 24, 1956  T. R. COLE  2,755,706
OPHTHALMIC LENSES AND METHOD OF MAKING SAME
Filed April 18, 1952

INVENTOR
THOMAS RUSSELL COLE
BY Louis L. Gagnon
ATTORNEY

United States Patent Office 2,755,706
Patented July 24, 1956

2,755,706

OPTHALMIC LENSES AND METHOD OF MAKING SAME

Thomas Russell Cole, Southbridge, Mass., assignor to American Optical Company, Southbridge, Mass., a voluntary association of Massachusetts Application April 18, 1952, Serial No. 283,099

4 Claims. (Cl. 88—54)

This invention relates to improvements in ophthalmic lenses and has particular reference to an improved multifocal lens and method of making the same.

One of the principal objects of the invention is to provide a multifocal lens and novel method of making the same having at least three major focal fields of different focal powers for the correction of distance, intermediate, and reading vision wherein the field of intermediate power is relatively long and narrow in a direction horizontally of the lens whereby a wide range of corrected vision is obtainable in said direction and the field of reading power is relatively narrow and is located substantially centrally of and directly beneath said intermediate field whereby corrected near vision is provided where required and distance vision may be readily obtained to one of either side of said reading field by merely moving the head in a sidewise direction to displace the reading field an amount sufficient to afford the wearer distance vision as, for example, when walking down stairs or the like.

Another object is to provide a multifocal lens and novel method of making the same having a major distance field, a relatively long and narrow field of intermediate power lying within the distance field and extending in a direction transversely of the vertical center line of the lens, said intermediate field having clifflike upper and lower edges, knifelike end edges and an exposed front surface flush with the front surface of the distance field, and a segment embedded within the glass of the major distance field with its upper edge being relatively thick and in engagement with the lower edge of the intermediate field and the remainder of its contour having a knifelike edge.

Another object is to provide a blank for a multifocal lens and method of making the same comprising a major piece of lens medium of a given index of refraction having a countersink in a side surface thereof and a composite button embodying a plurality of pieces of glass of different indices of refraction fused in edge to edge relation with each other secured in said countersink, one of said pieces of glass being relatively long and narrow and of a higher index of refraction than the index of the major piece of glass, said long and narrow piece of high index glass having fused to the upper edge thereof a piece of glass of substantially the same index of refraction as said major piece of glass and having edge fused to its lower edge two pieces of glass fused in superimposed relation with each other throughout an interface of controlled curvature, one of said pieces of glass having substantially the same index of refraction as said long and narrow high index piece of glass and the other having an index of refraction substantially the same as the index of refraction of the major piece of glass, said composite pieces of glass being fused in the countersink of said major piece of glass with the high index portion of the superimposed pieces lying between said countersink and said other superimposed piece of glass.

Another object is to provide a trifocal lens having a relatively long and narrow intermediate field and a reading field of less diameter beneath said intermediate field and method of making the same whereby the opposed ends of the intermediate field and the major portion of the contour of the reading field have curved knifelike edges of different radii and the related positions of the optical centers of the different focal fields may be varied.

Other objects and advantages of the invention will become apparent from the following description taken in connection with the accompanying drawings, in which, Fig. 1 is a front elevational view of the finished lens;

Figure 11:
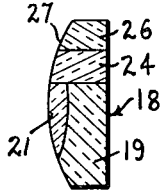
Figure 12:
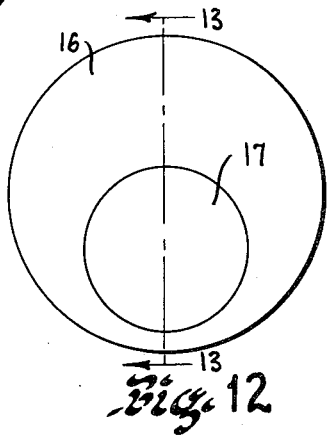
Fig. 12 is a view generally similar to Fig. 5 of the major piece of glass and illustrating a further step in the method of manufacture.
Figure 13:
Fig. 13 is a sectional view taken as on line 13—13 of Fig. 12 and looking in the direction indicated by the arrows.
Figure 14:
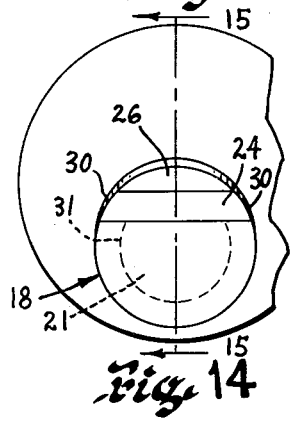
Fig. 14 is a view generally similar to Fig. 12 of the composite blank prior to the forming of the opposed desired optical surfaces thereon.
Figure 15:
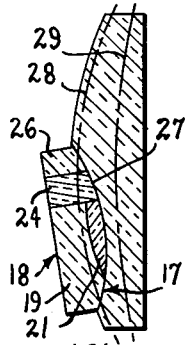
Fig. 15 is a sectional view taken as on line 15—15 of Fig. 14 and looking in the direction indicated by the arrows.

Referring more particularly to the drawings wherein like characters of reference designate like parts throughout the several views, the lens embodying the invention comprises a major piece of glass 16 of low index of refraction such, for example, as commercial crown glass having an index of refraction of approximately 1.5232, said major portion having a countersink 17 of a controlled size and surface curvature formed therein as shown in Figs. 12 and 13. In the countersink 17 there is fused a composite button 18 as shown in Figs. 11, 14 and 15.

Figure 5:
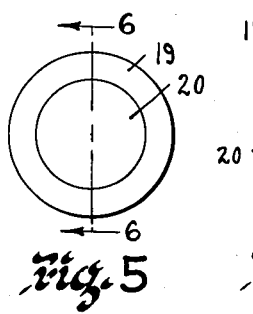
Fig. 5 is a front elevational view of the carrier piece of glass and illustrating another step in the method of manufacture.
Figure 6:
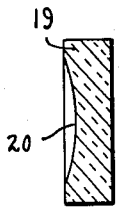
Fig. 6 is a sectional view taken as on line 6—6 of Fig. 5 looking in the direction indicated by the arrows.
Figures 7, 8:
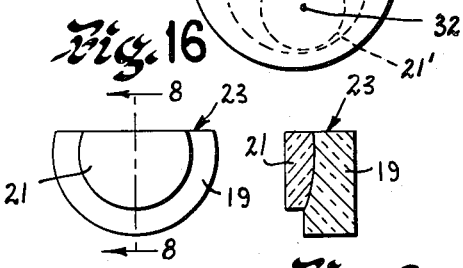
Fig. 7 is a view similar to Fig. 5 illustrating a further step in the method of manufacture.
Fig. 8 is a sectional view taken as on line 8—8 of Fig. 7 and looking in the direction indicated by the arrows.
Figure 9:
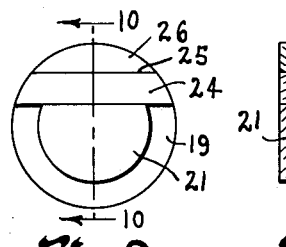
Fig. 9 is a view generally similar to Fig. 5 illustrating a further step in the method of manufacture.
Figure 10:
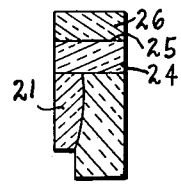
Figs. 10 and 11 are sectional views taken as on line 10—10 of Fig. 9 and looking in the direction indicated by the arrows and illustrating further steps in the method of manufacture.

The said composite button 18 comprises a main carrier portion 19 of glass of substantially the same index of refraction as the major piece of glass 16. The main carrier portion 19, as shown in Figs. 5 and 6, is provided with a countersink 20 of a controlled surface curvature adapted to receive and have fused or otherwise secured therein a segment of glass 21 of high index of refraction such, for example, as flint, barium crown or baryta glass having an index of refraction of approximately 1.61 to 1.70. The segment is provided with a surface curvature 22 on the countersink side thereof of a radius similar to that of the curvature of the countersink 20 and is adapted to be fused or otherwise secured in said countersink. Subsequent to securing the segment 21 in the countersink 20, the resultant assembly has a portion thereof removed to form a substantially flat or other desired shape of edge 23, as shown in Figs. 7 and 8. To the edge 23 there is fused or otherwise secured a piece of glass 24 having substantially the same index of refraction as the segment 21. This piece of glass 24 is in the form of a long and narrow strip extending throughout the width of the edge 23 and has secured to its edge 25, opposed to that secured to the edge 23, a filler piece of glass 26 having substantially the same index of refraction as the major portion 16.

The various pieces of glass shown in Figs. 3 through 10 are preferably secured in fused relation with each other and, as shown in Fig. 11, are provided with a surface curvature 27 on the segment side thereof of a radius to fit within the countersink 17 formed in the major piece of glass 16. The composite button 18, resulting from the above, is fused or otherwise secured in the countersink 17, as shown in Figs. 14 and 15, with the intermediate piece of glass 24 extending in a direction transversely of and in substantially normal relation to the vertical center line of the major piece of glass 16. A suitable base curve of a desired radius is formed on one side of the composite blank, as illustrated by the dot and dash line 28. In the finished lens the opposed side of the blank is provided with a desired prescriptive curve, as illustrated by the dot and dash line 29, whose radius of curvature is controlled according to the curvature of the base curve 28.

It is particularly pointed out that the size of the reading field 21 is controlled during the forming of the surface 27 on the composite button 18 and that the added power introduced by said segment 21 is controlled by the curvature of the countersink 20 in the carrier portion 19, the index of refraction of the glass of said segment and by the curvature of the surface 27.

The power of the intermediate field is controlled by the index of refraction of the long and narrow strip of glass 24, its thickness and the related curvatures of surface 27 and the outer surface 28.

It is further pointed out that the end edges 30 of the long and narrow piece of glass 24, in the finished lens, and the contour edge 31 of the segment 21, in the semi-finished lens blank and in the finished lens have curved knife edge like characteristics and are in substantially concentric relation with each other.

Due to the fact that the filler piece of glass 26 is of a lower index of refraction than the long and narrow piece of glass 24, the major portion of light impinging upon the upper side of said interface and which might be reflected into the eyes of the wearer will pass through said interface whereby only a minimum of light will be reflected.

Due to the fact that the segment 21 and the long and narrow piece of glass 24 are of substantially the same index of refraction, the interface between said pieces of glass will disappear upon fusion leaving no reflecting surface throughout said interface.

Further, due to the fact that the glass 19 overlying the segment 21 will be relatively thin, little reflection will take place throughout the interface intermediate said piece of glass 19 and the long and narrow piece of glass 24.

It is particularly pointed out that the long and narrow piece of glass 24 is so dimensioned as to provide a relatively wide intermediate field and the reading segment 21 is so dimensioned as to be of a diameter considerably less than the width of the reading field whereby distance vision may be obtained to one of either side of said reading field by merely moving the head in a sidewise direction an amount sufficient to displace the reading field from the line of vision and so cause the said line of vision to pass through the distance vision portion of the lens at said location as, for example, when walking downstairs or the like. The intermediate and reading fields, however, normally provide the required corrections as the eye passes in a downward direction during the normal use of the lens.

Figure 1:
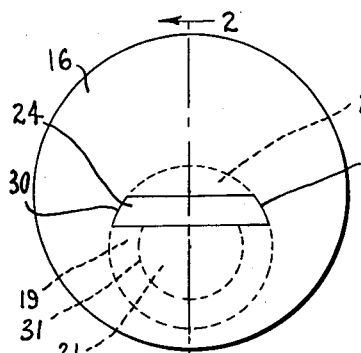
Figure 2:
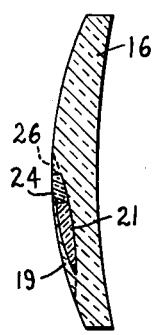
Fig. 2 is a sectional view taken as on line 2—2 of Fig. 1 and looking in the direction indicated by the arrows.
Figures 3, 4:
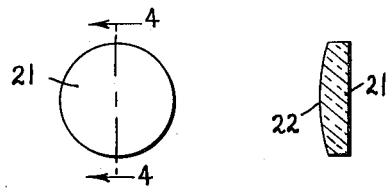
Fig. 3 is a front elevational view of a segment of glass illustrating one step in the method of manufacture.
Fig. 4 is a sectional view taken as on line 4—4 of Fig. 3 and looking in the direction indicated by the arrows.

Although the intermediate field and reading field of the lens, as shown in Fig. 1, has been shown and described as having portions of their contour edges in concentric relation with each other and the reading field has been described as being positioned substantially centrally of the intermediate field, it is to be understood that the curved knifelike edges of said intermediate and reading field may be formed in desired offset relation with each other and that the reading field may be set inwardly or outwardly with respect to the vertical center line of the intermediate field.

Due to the fact that the segment 21 is embedded within the lens medium of the major portion 16, its optical center 32 may be controlled independently of the centers of the major distance and intermediate fields. The position of the optical center or axis 33 of the intermediate field and the inset or outset relation of the reading field with respect to the vertical center line of the intermediate field may be varied when forming the base curve, or surface indicated by the dash line 28 in Fig. 15, on the segment side of the lens. This variation may be accomplished by tilting and offsetting the axis about which this surface is generated a desired amount with respect to the axis or center 32 of the reading or segment field 21.

Figure 16:
Fig. 16 is a view generally similar to Fig. 1 showing a slight modification of the invention.

As shown in Fig. 16, if the center or axis 33 about which the surface 28 is generated is offset to one side of the center or axis 32, the line of intersection of the surface 28, as indicated in Fig. 15, with the countersink 17' in the major portion 16' will be in offset relation with the contour of the reading or segment field 21', thereby causing the segment to be inset or outset with respect to the vertical axis of the intermediate field.

The position of the optical center 34 of the distance field relative to the optical centers 32 and 33 of the reading and intermediate fields respectively may be controlled when forming the prescriptive curve or surface indicated by the dot and dash line 29 in Fig. 15 in a conventional manner.

It is particularly pointed out that when the composite button is being formed for a finished lens of the type illustrated in Fig. 16 the filler 26' secured to the upper edge surface 24' of the intermediate field will be relatively wide and of an amount sufficient to fill in the countersink above said intermediate field.

The height of the intermediate and reading fields and the related widths thereof may be varied as desired during the fabrication of the lens. In each instance, however, the intermediate and reading fields will have a relatively thick upper edge and will both have knifelike side edges.

Although the major piece of glass and the main carrier and filler pieces of glass 19 and 26 respectively have been described as being commercial crown glass having an index of refraction of approximately 1.5232, these portions may be formed of glass having slightly different indices of refraction if desired.

Although the upper edges of the intermediate and reading fields are shown as being formed along straight lines it is to be understood that these edges may be curved upwardly or downwardly and formed to different angular relations with each other as desired. One of said edges may be curved upwardly or downwardly and the other formed straight as desired. By this it is meant that the said upper edges of said intermediate or reading fields may be formed to any desired shape and will be controlled during the initial forming of the composite button as shown in Figs. 5 through 11.

From the foregoing it is apparent that all of the objects and advantages of the invention have been accomplished. However, it is apparent that many changes may be made in the arrangement of parts and steps of the method shown and described without departing from the spirit of the invention as expressed in the accompanying claims. Therefore, it is to be understood that all matter and steps of the method shown or described should be interpreted as illustrative and not in a limiting sense.

Having described my invention I claim:

1. A method of forming a blank for a multifocal lens comprising forming a countersink of a controlled radius of curvature in one side surface of a major piece of lens medium of a known relatively low index of refraction, forming, in a side surface of a carrier piece of lens medium of the same index of refraction as said major piece, a countersink of a controlled radius of curvature, securing a piece of lens medium of a relatively high index of refraction in the countersink of said carrier piece of lens medium, removing a portion of one side of said carrier piece of lens medium and a portion of said high index lens medium in the countersink thereof to form an edge of a controlled shape, securing a long and narrow piece of high index lens medium to said edge resulting from the removal of one side of said carrier piece and the high index lens medium, said long and narrow piece of high index lens medium being of a length sufficient to extend substantially throughout the adjacent width of said carrier piece, securing a long and narrow piece of lens medium of the same index of refraction as said carrier piece to the upper edge of said long and narrow high index lens medium, forming a surface of a controlled curvature to fit within the countersink of the major piece of lens medium on the countersink side of the carrier piece of lens medium and the associated pieces of lens medium and to a depth sufficient to reduce the high index piece of lens medium in the countersink of the carrier piece to a desired diameter and securing the composite button resulting therefrom in the countersink in said major piece of lens medium with the long and narrow piece of high index lens medium extending in a direction transversely of vertical center line of the blank and with the high index lens medium fused in the countersink of said carrier piece of lens medium lying below said long and narrow strip of high index lens medium.

2. A method of forming a multifocal lens comprising forming a countersink of a controlled radius of curvature in one side surface of a major piece of lens medium of a known relatively low index of refraction, forming, in a side surface of a carrier piece of lens medium of substantially the same index of refraction as said major piece, a countersink of a controlled radius of curvature, securing a piece of lens medium of a relatively high index of refraction in the countersink of said carrier piece of lens medium, removing a portion of one side of said carrier piece of lens medium and a portion of said high index lens medium in the countersink thereof to form an edge of a controlled shape, securing the edge of a long and narrow piece of the same index lens medium as secured in the countersink of the carrier piece to said edge resulting from the removal of one side of said carrier piece and the high index lens medium, said long and narrow piece of high index lens medium being of a length sufficient to extend substantially throughout the adjacent width of said carrier piece, securing a long and narrow piece of lens medium of the same index of refraction as said carrier piece to the upper edge of said long and narrow high index lens medium, forming a surface of a controlled curvature to fit within the countersink of the major piece of lens medium on the countersink side of the carrier piece of lens medium and the associated pieces of lens medium and to a depth sufficient to reduce the high index piece of lens medium in the countersink of the carrier piece to a desired diameter, securing the composite button resulting therefrom in the countersink in said major piece of lens medium with the long and narrow piece of high index lens medium extending in a direction transversely of the vertical center line of the blank and with the high index lens medium fused in the countersink of said carrier piece of lens medium lying below said long and narrow strip of high index lens medium, forming a continuous curved surface of a controlled radius on the segment side of the major piece of lens medium and forming a continuous optical surface of a controlled curvature on the opposed side of said major piece of lens medium.

3. A semi-finished blank for a multifocal lens comprising a major piece of glass of relatively low index of refraction having a countersink with a surface of a controlled curvature in one side thereof, a relatively long and narrow horizontally disposed strip of high index glass extending transversely of said countersink and having its inner surface shaped to and fused throughout its area to the adjacent surface of the countersink, said strip having relatively thick substantially parallel upper and lower edges and having opposed knife-like outer ends curved to the adjacent contour edges of the countersink, a filler piece of glass of the same index of refraction as the major piece fused to the upper edge of said long and narrow strip and to the surface area of the countersink above said strip, a segment of glass of substantially the same index of refraction as said long and narrow strip having a relatively thick transversely extending upper edge portion fused to the lower edge of said long and narrow strip with the remainder of the contour thereof being circular and having a knife-like edge, the diameter of said circular segment being less than the length of said long and narrow strip and being so related with said strip as to cause the strip to extend outwardly beyond the opposed sides of said segment, said segment having its inner surface shaped to and fused to the adjacent surface of the countersink and having its opposed surface of a curvature controlled to introduce the added power desired throughout the area of said segment, a covering of glass of substantially the same index of refraction as said major piece of glass overlying said segment and having its upper edge fused throughout the length of the lower edge of said long and narrow strip and having a portion of its inner surface shaped to and fused to the adjacent surface of the segment and the remainder thereof being shaped to and fused to the countersink surface surrounding the segment, and a continuous optical surface extending over said major piece of glass, the glass of said long and narrow strip, the filler piece above said strip and over said cover layer and being of a curvature controlled to function cooperatively with the curvature of the countersink to produce the power desired throughout the area of said long and narrow strip and to simultaneously function as the overall base curve of the ultimate lens to be formed by said blank.

4. A multifocal lens comprising a major piece of glass of relatively low index of refraction having a countersink with a surface of a controlled curvature in one side thereof, a relatively long and narrow horizontally disposed strip of high index glass extending transversely of said countersink and having its inner surface shaped to and fused throughout its area to the adjacent surface of the countersink, said strip having relatively thick substantially parallel upper and lower edges and having opposed knife-like outer ends curved to the adjacent contour edges of the countersink, a filler piece of glass of the same index of refraction as the major piece fused to the upper edge of said long and narrow strip and to the surface area of the countersink above said strip, a segment of glass of substantially the same index of refraction as said long and narrow strip having a relatively thick transversely extending upper edge portion fused to the lower edge of said long and narrow strip with the remainder of the contour thereof being circular and having a knife-like edge, the diameter of said circular segment being less than the length of said long and narrow strip and being so related with said strip as to cause the strip to extend outwardly beyond the opposed sides of said segment, said segment having its inner surface shaped to and fused to the adjacent surface of the countersink and having its opposed surface of a curvature controlled to introduce the added power desired throughout the area of said segment, a covering of glass of substantially the same index of refraction as said major piece of glass overlying said segment and having its upper edge fused throughout the length of the lower edge of said long and narrow strip and having a portion of its inner surface shaped to and fused to the adjacent surface of the segment and the remainder thereof being shaped to and fused to the countersink surface surrounding the segment, a continuous optical surface extending over said major piece of glass, the glass of said long and narrow strip, the filler piece above said strip and over said cover layer and being of a curvature controlled to function cooperatively with the curvature of the countersink to produce the power desired throughout the area of said long and narrow strip and to simultaneously function as the overall base curve of the lens and a finished optical surface on the opposed side of said lens.

References Cited in the file of this patent

UNITED STATES PATENTS

| | | |
|---|---|---|
| 1,866,734 | Tillyer | July 12, 1932 |
| 2,033,573 | Hancock | Mar. 10, 1936 |
| 2,035,846 | Sterling | Mar. 31, 1936 |
| 2,053,551 | Culver et al. | Sept. 8, 1936 |
| 2,071,616 | Culver et al. | Feb. 23, 1937 |
| 2,173,651 | Hill | Sept. 19, 1939 |
| 2,177,022 | Hammon | Oct. 24, 1939 |
| 2,274,143 | Houchin | Feb. 24, 1942 |